Figure 1:
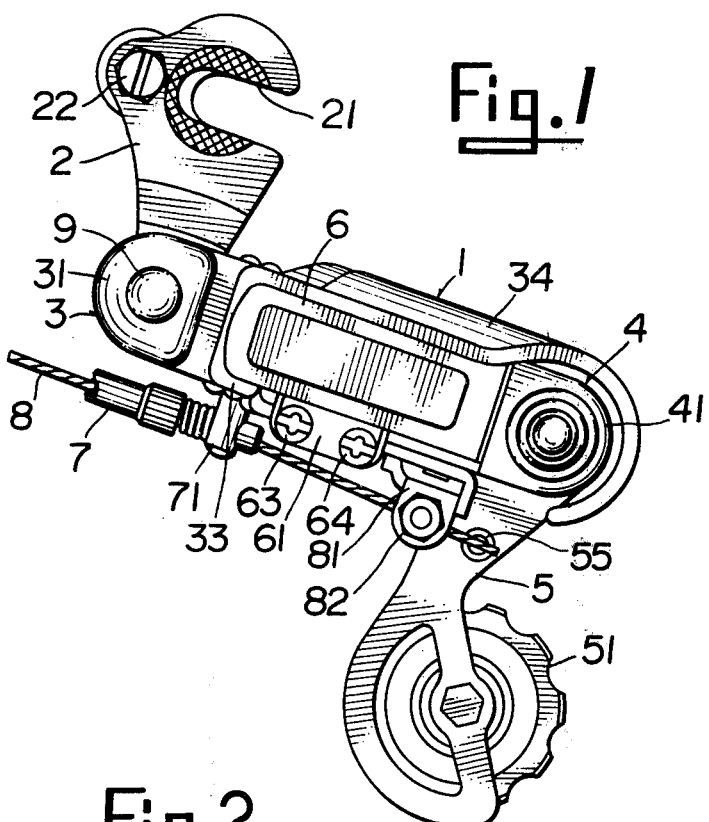

United States Patent [19]

Nagano

[11] 4,027,542
[45] June 7, 1977

[54] DERAILLEUR FOR BICYCLE

[75] Inventor: Masashi Nagano, Sakai, Japan

[73] Assignee: Shimano Industrial Company, Limited, Osaka, Japan

[22] Filed: Sept. 23, 1975

[21] Appl. No.: 615,920

[30] Foreign Application Priority Data

Oct. 4, 1974 Japan .............................. 49-114983
Oct. 4, 1974 Japan .............................. 49-114984
Oct. 4, 1974 Japan .............................. 49-114985
Oct. 4, 1974 Japan .............................. 49-114986

[52] U.S. Cl. ................................ 74/217 B; 74/242
[51] Int. Cl.² ............................................ F16H 7/22
[58] Field of Search ........ 74/217 B, 242, 242.11 B, 74/242.14 B, 242.15 B

[56] References Cited

UNITED STATES PATENTS

| 3,111,855 | 11/1963 | Juy | 74/242 |
| 3,181,383 | 5/1965 | Juy | 74/217 B |
| 3,364,763 | 1/1968 | Juy | 74/217 B |
| 3,710,636 | 1/1973 | Ozaki | 74/217 B |
| 3,803,933 | 4/1974 | Huret et al. | 74/217 B |

FOREIGN PATENTS OR APPLICATIONS 1,085,622  2/1955  France .............................. 74/217 B

OTHER PUBLICATIONS

"The Handbook of Cycl–Ology" 6th edition, p. 58, 1973, copyrighted 1967-1973.

Primary Examiner—Samuel Scott
Assistant Examiner—Allan R. Burke
Attorney, Agent, or Firm—Stevens, Davis, Miller & Mosher

[57] ABSTRACT

In a derailleur for a bicycle, improved pivotal connections between a bracket fixed to a bicycle frame and a support mounted to the bracket and rotatable only in a given range, and between a movable member supported on the support through links and a chain-change-over frame carried with the movable member through swinging motion only in a given range. At least one of the bracket and the support and one of the movable member and the chain-change-over frame is integrally formed in projection by a press a pivot or a receptor receiving the pivot therein, thereby to provide a derailleur having a reduced number of parts for pivotting and saving processes in assembly with attendant low costs of manufacture.

5 Claims, 8 Drawing Figures

U.S. Patent  June 7, 1977  Sheet 1 of 3  4,027,542

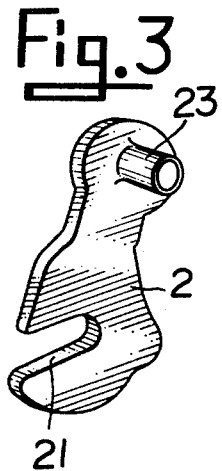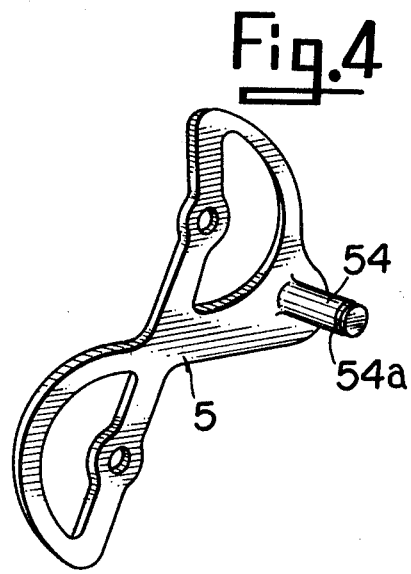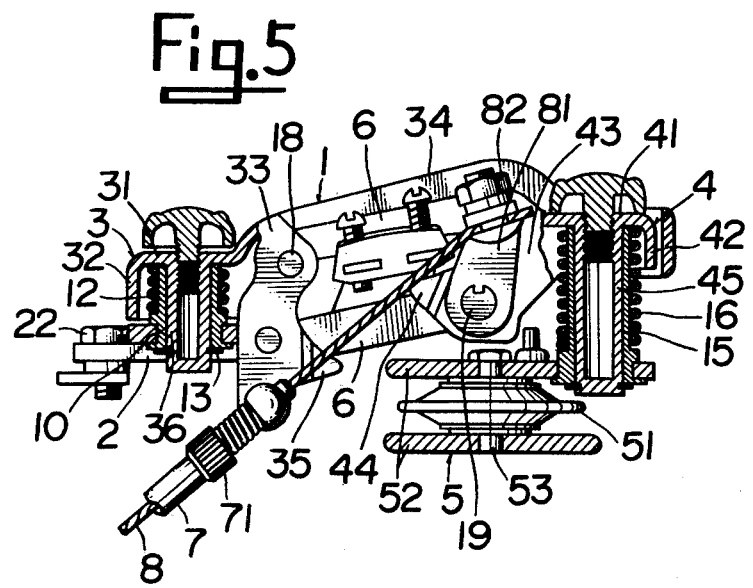

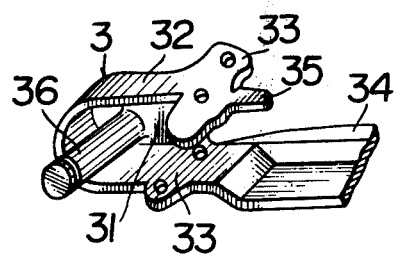
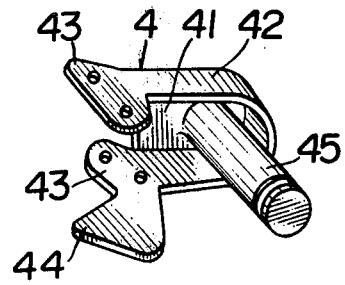
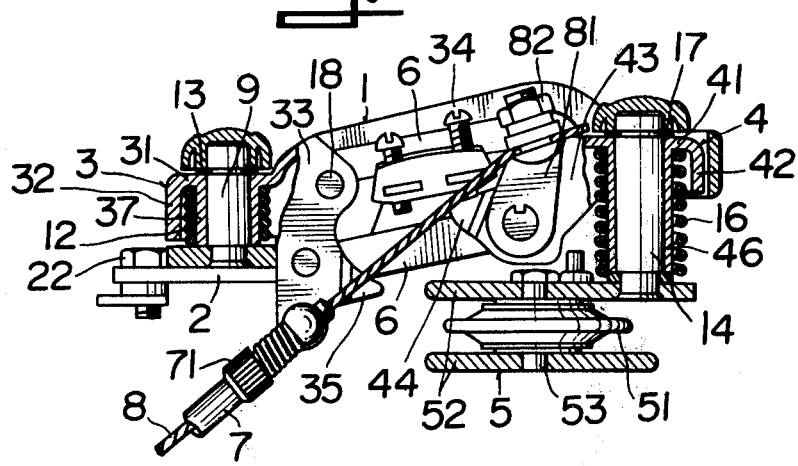

DERAILLEUR FOR BICYCLE

This invention relates to a derailleur for a bicycle, and moe particularly to a derailleur which is mounted to a bicycle frame correspondingly to multi-speed freewheels at a rear hub of the bicycle so that a driving chain may be shifted to a selective one sprocket of the freewheels for changing speed.

Conventionally, this kind of derailleur is composed of a bracket fixed to a bicycle frame, a support rotatably mounted to the bracket only in a given range, a movable member supported with the support through two parallel links, and a change-over frame having two chain-guid sprocket wheels and carried with the movable member in a relation of being rotatable only in a given range. The derailleur is adapted to shift the driving chain to one of the freewheels by stretching the chain with the guide wheels and shifting the change-over frame.

In the derailleur, pivoting of the bracket and the support, and that of the movable member and the change-over frame are conventionally built up with a pivot and a receptor thereof. Being formed separately from the aforesaid members constituting the derailleur, the pivot and receptor are fixed thereto by caulking or the like respectively. Namely, in pivoting of the bracket and the support, the pivot and receptor are formed independently of the members, the pivot, for example, being fixed to the bracket and the receptor to the support. Also, the movable member and the change-over frame are pivoted through the pivot and receptor which are formed separately from the members to be fixed to, for example, the change-over frame and the movable member respectively.

As a result, a conventional derailleur increases in the number of parts to make trouble the parts management, and also the pivot and receptor are required to be fixed by caulking or the like so that working processes increase in assembly resulting in a lower efficiency with attendant substandard products.

A main object of the invention is to provide a derailleur for a bicycle with fewer parts thereof.

Another object of the invention is to provide a derailleur for a bicycle, efficient in assembly and inexpensie to manufacture.

Still another object is to provide a derailleur of improved pivotal connections between a bracket and a support, and between a movable member an a change-over frame, in which connections such a complicated process as caulking or the like is not necessary, so that the aforesaid members may be readily pivoted with each other.

The principle of the invention is the improvement in pivoting of a bracket fixed to a bicycle frame and a support rotatably mounted to the bracket, and of a movable member supported to the support through links and a chain change-over frame carried with the movable member in a regularly rotatable relation, that is, a pivot or a receptor thereof is formed by a press in a projection integrated with at least one of the bracket and the support, and with one of the movable member and the change-over frame. Therefore, the invention has eliminated the defect caused by the formation of the pivot and receptor separated from the members in a conventional derailleur.

Figure 2:
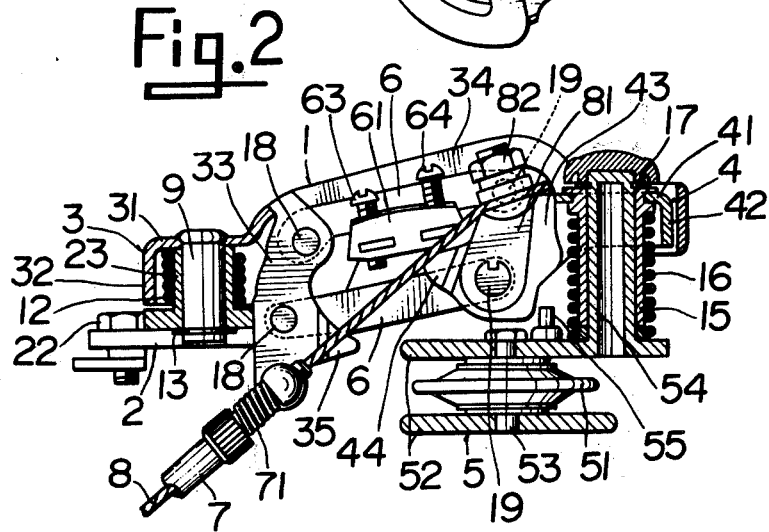

The abovementioned objects of the invention and others will be apparent from the following description in accordance with the accompanying drawings, in which FIG. 1 is an elevation of a derailleur of the invention, FIG. 2 is a bottom plan view partially in section of pivotal connections of the derailleur in FIG. 1, FIG. 3 is a perspective view of a bracket of the derailleur in FIGS. 1 and 2, FIG. 4 is a perspective view of a part of a change-over frame of the derailleur shown in FIGS. 1, and 2, FIG. 5 is a bottom plan view of a modified embodiment of the derailleur in FIGS. 1 and 2, partially in section of modified pivotal connections thereof, FIG. 6 is perspective view of a support of the derailleur shown in FIG. 5, FIG. 7 is a perspective view of a movable member of the derailleur in FIG. 5, and FIG. 8 is a bottom plan view of another modified embodiment of the derailleur of the invention, partially in section of pivotal connections thereof.

Now, an embodiment of the invention will be described in accordance with FIGS. 1 through 4.

Referring to the drawings, a derailleur generally designated with the numeral referene 1, comprises a bracket 2 to be fixed to a bicycle frame (not shown), a support 3 mounted on the bracket 2, a movable member 4 supported on the support 3 through two parallel links 6, 6, a chain change-over frame 5 having chain-guide sprocket wheels 51, 51 and carried with the movable member 4.

The bracket 2 is formed of a metal plate and provided with: a cutout 21 for insertibly engaging through the bracket with a rear wheel shaft (not shown) supported on the bicycle frame; a set bolt 22, adjacent the cutout 21, nonrotatably holding the bracket 2 against the bicycle frame; and a pivot-receptor 23, as shown in FIG. 3, integrated with the bracket at its root portion opposite to the cutout. The pivot-receptor 23 and a pivot to be described hereinafter build up pivoting of the support 3 to the bracket 2 in a manner that the metal plate of the bracket 2 is pressed in constriction to be formed in a projection integrated with the bracket. The pivot-receptor 23 has axially a length sufficient enough to keep a regularly spaced interval between an opposite face of the bracket and a front wall of the support 3 to be described herein-after.

The support 3 formed of a metal plate comprises: a front wall 31, of a semielliptical shape, parallel to the root of the bracket 2; a lateral wall 32 extending from the front wall 31 toward the bracket 2; and a pair of opposite arms 33, 33 extending from both ends of the lateral wall 32 so as to each support one end of the parallel links 6, 6. One of the arms 33, 33 is extending toward the movable member 4 to form a guard 34, and the other of the arms is outwardly extending to form a stopper 35 in abutment against a stroke-adjust bolt 63 to be described hereinafter and retainer 71 for retaining an outer cable 7 therewith.

At substantially the center of the front wall 31 of the support 3 is formed a through hole into which a pivot 9 is to be inserted. As is shown in FIG. 2, being formed separately from the bracket 2 and the support 3, the pivot 9 is preferable to be, as shown in FIG. 5, formed in a projection integrated with the front wall by being pressed in constriction.

The bracket 2, constituted as aforesaid, is pivoted to the support 3 in a manner that the root of the bracket 2 and the front wall 31 at the support 3 are opposite each other, the receptor 23 integrated with the bracket 2 is abutted at the utmost end thereof against an inner surface of the front wall 31, and the pivot 9 is inserted into the receptor 23 through the hole at the front wall 31 to exceed the outside of the bracket 2 so as to be retained with a snap ring 13. Around the receptor 23 is wound a helical coil spring 12 both ends of which are retained to the bracket 2 and the support 3 respectively so that the support 3 may be biased always in one direction (a counterclockwise direction). In addition, the support 3 is supported on the bracket 2 in a relation of being controlled to be rotatable within a given range by means of a stopper (not shown) at the bracket 2 and the arm 33 at the support 3.

The movable member 4 formed, similarly to the support 3, of a metal plate comprises; a front wall 41 of a semielliptical shape; a lateral wall 42 extending from the front wall 41 toward the change-over frame 5; and a pair of arms 43, 43 for mounting the movable member 4 to the links 6, 6, opposite to each other, extending from both ends of the lateral wall 42 in the opposite direction to the links 6, 6. At one of the arms 43, 43, is provided a stopper 44 in abutment against a stroke-adjust bolt 64 and an arm 81 having at its utmost end a retainer 82 holding an inner wire 8 at a terminal thereof.

The chain-change-over frame 5 is composed of two plates 52, 52, opposite to each other, with a given spaced interval therebetween, supporting the guide sprocket wheels 51, 51 by means of two spindles 53, 53, connecting the plates therewith. As shown in FIG. 4, at one of the two plates 52, 52, is formed a pivot 54 in a projection integrated with the plate.

The pivot 54 is slightly smaller in outer diameter thereof than the inner diameter of the receptor 15 which is separately formed, and larger in length than the receptor 15. The pivot 54 is formed in a manner that at first a steel plate of required size is pressed in constriction at a portion to be the pivot when the plate 52 is formed, thereafter, the steel plate is punched to be the plate 52 constituting the change-over frame 5. The pivot 54 is formed in a cylindrical shape with one closed, but its hollow body man be cut at the closed end. The pivot is provided with an annular groove 54a surrounding the foremost end of the pivot 54 for receiving a snap ring to be described hereinafter.

In addition, the receptor 15 is preferred to be, as shown in FIG. 5, formed integrally with the movable member 4 other than being formed separately therefrom to be fixed thereto. The receptor 15 and the pivot 54 serve together to pivotally support the change-over frame 5 to the movable member 4, keeping both members with a given spaced interval therebetween. The change-over frame 5 is pivoted to the movable member 4 in a manner that the front wall 41 of the latter is opposed to the plate 52 of the former and the pivot 54 integrated with the plate 52 is inserted into the receptor 15 to extend outside of the front wall 41 for being retained with a snap ring 17. In addition, around the receptor 15 is wound a helical coil spring 16 of which both ends are retained to the movable member 4 and the change-over frame 5 respectively so that the change-over frame may be urged always in one direction (in a clockwise direction).

The abovementioned change-over frame 5 is provided with a stopper 55 outwardly projecting at the pivot side of the frame, which stopper is abutted against one arm 43 at the movable member 4 to control swinging motion of the frame so that the change-over frame may be swung around the pivot with respect to the movable member 4 only in a given range.

The links 6, 6, are each pivoted at one end thereof to the arms 33, 33, at the support 3 through pins 18, 18 and are each pivoted at the other end to the arms 43, 43 at the movable member 4 through pins 19, 19 respectively so that the movable member 4 may be supported with respect to the support 3 through a parallelogrammic motion of the links 6, 6 and the arms 33, 33 and 43, 43. The parallelogrammic motion is controlled by abutment of the stoppers 35 and 44 against adjust bolts 63 and 64 provided at a tongue 61 at the outer link 6. Between one link 6 and the movable member 4 is provided a coiled spring (not shown) for urging the latter only in one direction.

The derailleur, as described above, is mounted to the bicycle frame through the bracket 2, and the driving chain is stretched around the guide sprocket wheels 51, 51. Pull of the inner wire 8 by an operating level (not shown) allows the movable member 4 to move with respect to the support 3 to result in an adequate shifting of the guide wheels 51, 51 at the change-over frame 5 carried with the movable member 4, thereby to shift the driving chain to a selective one of sprockets (not shown).

In the abovementioned construction, because the receptor 23 is integrated with the bracket 2 and not separately formed, the receptor 23 does not have to be caulked to the bracket 2. As a result, the number of parts of the derailleur are reduced to result in saving proceses in assembly. Similarly, the pivot 54 integrated with the change-over frame 5 is not separately formed, requires no caulking, and has the same advantages as aforesaid.

Referring to FIG. 5, a modified embodiment of the derailleur of the invention has, as shown in FIG. 6, a pivot 36 formed in a projection integrated with the front wall 31 at the support 3 and, as shown in FIG. 7, a pivot 45 similarly formed at the front wall 41 of the movable member 4.

Referring to FIG. 8, another modified embodiment of the invention has a receptor 37 formed in a projection integrated with the front wall 31 at the support 3 and a receptor 46 similarly formed at the front wall 41 of the movable member 4.

The derailleur in FIG. 5 has a receptor 10 formed separately from the bracket 2, which receptor 10 may, as seen in FIGS. 2 and 3, be integrated with the bracket 2, and has a receptor 15 formed separately from the change-over frame 5, which receptor 15 may be integrated with the frame 5. Similarly, for the derailleur in FIG. 8, pivots 9 and 14, formed separately from the support 3 and the movable member 4, may, as shown in FIG. 5, be integrated with both the members respectively.

It is most preferable as aforesaid to provide the pivot and the receptor formed integrally with one of the bracket 2 and the support 3 and with the other thereof respectively, also, the pivot and the receptor formed integrally with one of the movable member 4 and the chain-change-over frame 5 and with the other thereof respectively. Such constitution can be readily built up as aforesaid.

As is clearly understood from the abovementioned description, the derailleur of the invention has the bracket pivoted to the support and the movable member pivoted to the chain-change-over frame through the pivot and the receptor respectively, in which at least one of the pivot and the receptor is formed integrally of one of the bracket and the support and one of the movable member and the chain-change-over frame respectively. Hence, there is no need for the pivot or the receptor or both the pivot and receptor, to be separately formed so that the number parts of the derailleur may, to that extent, be reduced and the fixing work by caulking may be neglected to result in saving processes in assembly.

While the form of embodiment of the invention as herein disclosed constitutes a preferred form, it is to be understood that other forms might be adopted, all coming within the scope of the claims which follow.

What is claimed is:

1. A derailleur for a bicycle having a frame member, said derailleur comprising:
    a bracket fixed to the frame member of the bicycle,
    a support mounted to said bracket and rotatable relative thereto through a given range,
    two parallel links, one end of each of said links being pivotally connected to said support,
    a movable member pivotally connected to the other end of each of said links,
    a chain change-over frame having two chain-guide sprocket wheels,
    said frame being mounted to said movable member and rotatable relative thereto through a given range,
    said bracket having a base and a forked end,
    mounting means connected to the base for rotatably carrying said support thereon,
    said support and said movable member each comprising a front wall parallel to said bracket, a side wall extending toward said bracket adjacent to said front wall, and mounting walls opposite to each other and extending adjacent to said side wall,
    a first tubular member integral with and extending from a central portion of said front wall of the support said first tubular member being rotatably sleeved to said mounting means connected to the base of said bracket to thereby rotatably support said support,
    said chain change-over frame comprising two guide plates rotatably carrying two chain-guide sprocket wheels therewith, one of said two guide plates having mounting means for being rotatably supported on said movable member, and
    a second tubular member integral with said front wall of the movable member and extending from said front wall of the movable member toward said one of said guide plates, said second tubular member being rotatably sleeved to said mounting means of said one of said guide plates so that said guide plates may be rotatably supported on said movable member.

2. The derailleur according to claim 1, wherein said mounting means connected to the base of said bracket comprises a tubular pivot integral with said base, extending toward said front wall of said support and havng an outer diameter smaller than an inner diameter of said first tubular member, said tubular pivot being within said first tubular member so that said support may be rotatably supported on said bracket.

3. The derailleur according to claim 1, wherein said mounting means connected to the base of said bracket comprises a tubular pivot receptor integral with said base, extending toward said front wall of the support, and having an inner diameter larger than an outer diameter of said first tubular member, said tubular pivot receptor being sleeved onto said first tubular member so that said support may be rotatably supported on said bracket.

4. The derailleur according to claim 1, wherein said mounting means of said one of said guide plates of said chain change-over frame comprises a tubular pivot integral with said one of said guide plates, said tubular pivot extending toward the front wall of said movable member and having an outer diameter smaller than an inner diameter of said second tubular member, said tubular pivot being within said second tubular member so that said chain change-over frame may be rotatably supported with respect to said movable member.

5. The derailleur according to claim 1, wherein said mounting means of said one of said guide plates of said chain change-over frame comprises a tubular pivot receptor integral with said one of said guide plates of said chain change-over frame, said tubular pivot receptor extending toward the front wall of said movable member and having an inner diameter larger than an outer diameter of said second tubular member of said movable member, said pivot receptor being sleeved onto said second tubular member so that said chain change-over frame may be rotatably supported with respect to said movable member.

* * * * *